United States Patent Office 3,108,035
Patented Oct. 22, 1963

3,108,035
RUBBER-METAL LAMINATES INVOLVING A CHLORINATED RUBBER BASE CEMENT
George Rappaport, Donald R. Strack, and Donald E. Stare, Dayton, Ohio, assignors to General Motors Corporation, Detroit, Mich., a corporation of Delaware
No Drawing. Filed Nov. 23, 1959, Ser. No. 854,568
4 Claims. (Cl. 161—221)

This invention relates to adhesives and is particularly concerned with adhesive cements for use in rubber-to-metal adhesion processes.

It is an object of this invention to provide an adhesive that will be applicable to one-coat processing for adhering rubber to metal.

A further object of the invention is to provide a chlorinated rubber base cement which will produce strong bonds between rubber and metal and wherein the cement is adapted for one-coat application.

A still further object of the invention is to provide a chlorinated rubber cement including dibenzoquinone dioxime and lead peroxide which produces a strong bond between various types of rubbery materials and metals.

A still further object is to provide a cement which will bond butyl rubber to metal without the use of a cover cement.

Further objects and advantages of the present invention will be apparent from the following description.

Adhesion cements suitable for forming bonds between rubber-like materials and metals vary in accordance with the rubber-like material to be bonded to the metal. In many instances, these cements require a cover cement applied over the rubber part prior to application of the cement in order to obtain a satisfactory bond. The present composition provides a cement which offers good adhesion between rubber-like materials of many types and various kinds of metals. For example, the present cement is useful in bonding natural rubber, butadiene styrene copolymer rubber, butadiene acrylonitrile copolymer rubber, polychloroprene rubber, butyl rubber, compatible combinations thereof, etc. Any number of metals can be used as the other phase of the assembly, for example, steel, cast iron, aluminum, cadmium, zinc, brass, bronze, copper, stainless steel, lead, chromium, etc. In all cases, it is understood, of course, that the metal surface should be prepared for the bonding operation by either a surface chemical treatment or by a mechanical treatment such as shot-blasting or the like, these expedients being well known in the art.

Specifically, the cement which forms the subject of this invention is a chlorinated rubber cement wherein a chlorinated rubber, such as Parlon sold by Hercules Powder Company, is the base. This particular material includes chlorine in quantities of about 65% and has a base of natural rubber. Other rubbers containing between 55% and 69% by weight of chlorine may be used. In order to make the cement, the chlorinated rubber is compounded with lead peroxide and dibenzoquinone dioxime in a solvent whereby a satisfactory cement is provided. It is to be understood that, while the material herein described is a highly satisfactory one-coat cement, improved pulls may be obtained through the use of a cover layer or cover cement made by dissolving any of the normal rubber compounds above referred to in a suitable organic solvent such as an aromatic solvent taken from the class of compounds such as benzene, toluene, xylene, carbon tetrachloride, etc.

Specifically, the following recipe provides a most satisfactory cement: chlorinated rubber 100 grams (Parlon), lead peroxide 60 grams, dibenzoquinone dioxime 10 grams, and xylene 625 grams. These materials are compounded by dissolving the chlorinated rubber in the xylene and then mixing the lead peroxide and the dibenzoquinone dioxime therein while heating the mixture in the neighborhood of about 250° F. for about two hours. Other aromatic solvents may be used such as benzene, toluene, etc., although xylene is preferred due to its boiling point which permits higher reaction temperatures.

The cement compounded by this procedure will have a viscosity of about four seconds using a #4 Ford cup and may be brushed, sprayed or otherwise applied to the metal part in a thin layer after the part has been prepared as noted hereinbefore and the part may then be applied to the rubber material to which it is to be bonded. The cement is preferably cured under heat and pressure for a time sufficient to form a strong bond. In general, pressures in the order of 750 to 1000 pounds per square inch are applied and the parts are heated for a period of from ten to thirty minutes at 300° F. to 350° F. Under these conditions, a bond between natural rubber and 1010 or 1020 steel may be obtained which has a strip pull strength of 140 pounds per inch. Similarly, butadiene styrene copolymer may be bonded to steel and have a bond strength of the same order. Butadiene acrylonitrile copolymer and neoprene, when bonded by this procedure, exhibit strip pull strengths in the order of 150 pounds per inch while butyl rubber will bond with a strip pull strength of 90 pounds per inch.

While the foregoing is a preferred embodiment of the invention, it is apparent that wide variations in the formulation may be made without destroying the usefulness of the cement. In this connection, the bond strength may vary within limits of ±25% of the optimum but, in all cases, within the ranges which are set forth in the following formula the cement will present a useful and strong bonding medium.

Deviations in recipe are as follows: chlorinated rubber 100 grams (natural rubber with from 55% to 69% by weight of chlorine), xylene 180 to 4450 grams, lead peroxide 5 to 200 grams, dibenzoquinone dioxime 2 to 30 grams. These materials may be reacted by dissolving the chlorinated rubber in the solvent and mixing the solution with the other ingredients. In this connection, a reaction time having a ten minute minimum and a five hour maximum is contemplated at temperatures of from 180° F. to 380° F. varying inversely as the time.

Cover cements, if desired, as referred to hereinbefore, may be made for any specific rubber-like material by dissolving the rubber-like material in one of the solvents noted and then brushing it onto the surface of the rubber-like part and permitting it to air dry prior to the application of the bonding layer.

It is apparent that, as the quantity of solvent in the foregoing formulations increases, the cement decreases in viscosity and, in some instances, it may be necessary to apply a plurality of coats, permitting air drying between coats, to obtain a satisfactory thickness of coating in accordance with the pull strength desired and may best be determined by trial. In general, however, a coating merely brushed onto the horizontal surface of the metal part will provide a coating of the desired thickness for satisfactory bonding operations.

The success of this cement as a means for bonding butyl rubber to metal is attributed to the conjoint use of lead peroxide and dibenzoquinone dioxime as the accelerator system for the chlorinated rubber.

Heretofore, cements which provided useful bonds for the majority of rubbery materials to metals have not been satisfactory when butyl rubber is one of the components of the system. The particular cement set forth herein is not only a good adhesive for the more common rubbery materials but, likewise, forms strong bonds between butyl rubber and metal making it an all-purpose material. Furthermore, the present cement does not require the use of a cover cement to produce a useful bond and, thus, may be termed a "one-coat cement."

While the embodiments of the present invention as herein disclosed constitute preferred forms, it is to be understood that other forms might be adopted.

What is claimed is as follows:

1. A laminated structure comprising a metal base and an elastomeric layer taken from the class consisting of natural rubber, butadiene styrene copolymer rubber, butadiene acrylonitrile copolymer rubber, polychloroprene rubber, butyl rubber, and compatible mixtures thereof wherein said elastomeric layer is coextensively adhered to said base by means of a bonding layer coextensively disposed between the metal base and said elastomeric layer, said bonding layer initially consisting essentially of chlorinated rubber having a chlorine content of between 65% and 69% dissolved in an organic solvent therefor wherein said chlorinated rubber is present in quantities of about 100 parts together with lead peroxide 5 to 200 parts and dibenzoquinone dioxime 2 to 30 parts, all parts being expressed by weight.

2. A laminated structure comprising a metal base and an elastomeric layer taken from the class consisting of natural rubber, butadiene styrene copolymer rubber, butadiene acrylonitrile copolymer rubber, polychloroprene rubber, butyl rubber, and compatible mixtures thereof wherein said elastomeric layer is coextensively adhered to said base by means of a bonding layer coextensively disposed between the metal base and said elastomeric layer, said bonding layer initially consisting essentially of chlorinated rubber having a chlorine content of between 65% and 69% dissolved in an organic solvent therefor wherein said chlorinated rubber is present in quantities of about 100 parts together with lead peroxide 60 parts and dibenzoquinone dioxime 10 parts, all parts being expressed by weight.

3. A laminated structure comprising a metal base and an elastomeric layer consisting of butyl rubber wherein said elastomeric layer is coextensively adhered to said base by means of a bonding layer coextensively disposed between the metal base and said elastomeric layer, said bonding layer initially consisting essentially of chlorinated rubber having a chlorine content of between 65% and 69% dissolved in an organic solvent therefor wherein said chlorinated rubber is present in quantities of about 100 parts together with lead peroxide 5 to 200 parts and dibenzoquinone dioxime 2 to 30 parts, all parts being expressed by weight.

4. A laminated structure comprising a metal base and an elastomeric layer consisting of butyl rubber wherein said elastomeric layer is coextensively adhered to said base by means of a bonding layer coextensively disposed between the metal base and said elastomeric layer, said bonding layer initially consisting essentially of chlorinated rubber having a chlorine content of between 65% and 69% dissolved in an organic solvent therefor wherein said chlorinated rubber is present in quantities of about 100 parts together with lead peroxide 60 parts and dibenzoquinone dioxime 10 parts, all parts being expressed by weight.

References Cited in the file of this patent

UNITED STATES PATENTS

| | | |
|---|---|---|
| 2,170,191 | Fisher | Aug. 22, 1939 |
| 2,259,190 | Winkelmann et al. | Oct. 14, 1941 |
| 2,581,920 | Kuhn | Jan. 8, 1952 |

FOREIGN PATENTS

| | | |
|---|---|---|
| 498,824 | Canada | Dec. 29, 1953 |

OTHER REFERENCES

Industrial and Engineering Chemistry, vol. 38, pages 1171–1181, 1946.

Synthetic Rubber, by G. S. Whitby, pages 867–868, publ. 1954.